United States Patent [19]
Markham

[11] Patent Number: 5,907,331
[45] Date of Patent: *May 25, 1999

[54] INK-JET PRINTHEAD WITH ON-CHIP SELECTION OF PRINT MODES

[75] Inventor: Roger G. Markham, Webster, N.Y.

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/804,566

[22] Filed: Feb. 24, 1997

[51] Int. Cl.[6] ............................................. B41J 29/38
[52] U.S. Cl. ............................... 347/12; 347/9; 347/14
[58] Field of Search ................................. 347/12, 9, 40, 347/14

[56] References Cited

U.S. PATENT DOCUMENTS 5,675,365   10/1997   Becerra et al. ................................ 347/9

*Primary Examiner*—N. Le
*Assistant Examiner*—Thinh Nguyen
*Attorney, Agent, or Firm*—R. Hutter

[57] ABSTRACT

An ink-jet printhead chip in which digital image data is submitted to circuitry on a printhead, "mode signals" are periodically loaded into the printhead circuitry along with the image data. The mode signal can determine which of a plurality of subsets of ejectors in the printhead are to be activated at any given time. By iteration or manipulation of these mode signals, various specific print-quality techniques, such as entering a "draft mode" or altering the order of ejector activation across the array, can be carried out.

5 Claims, 5 Drawing Sheets

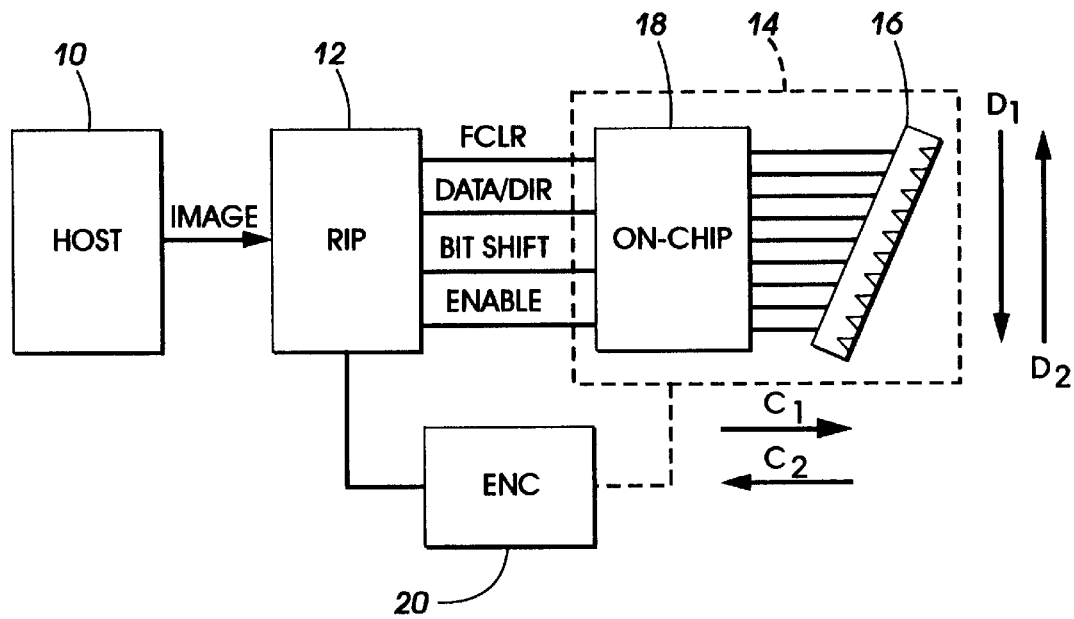
FIG. 1
PRIOR ART
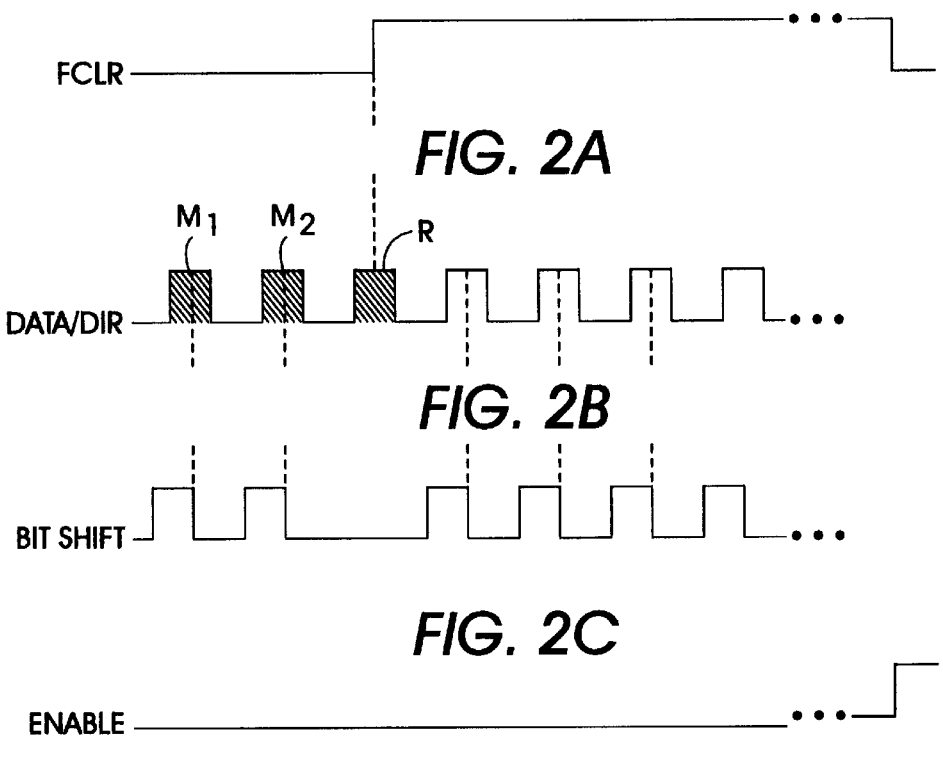

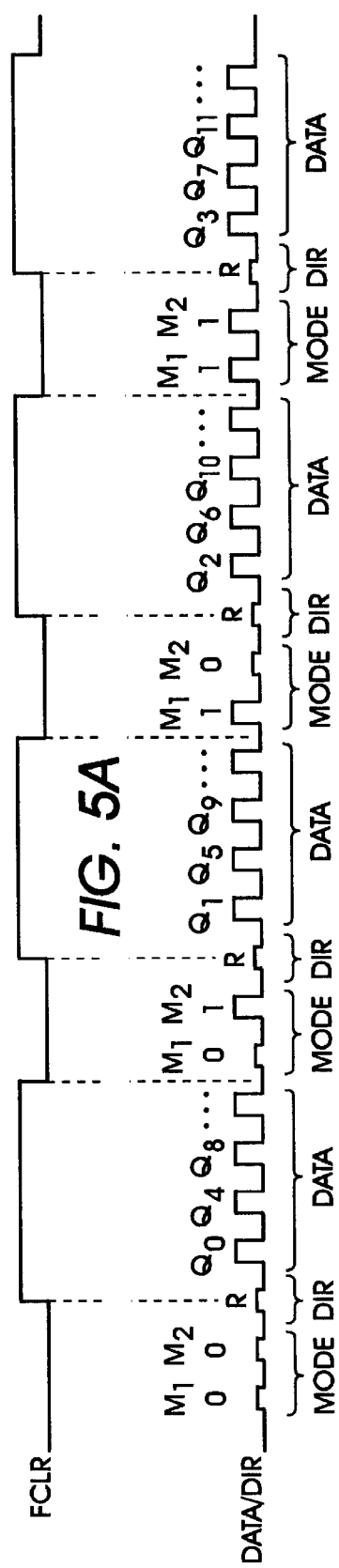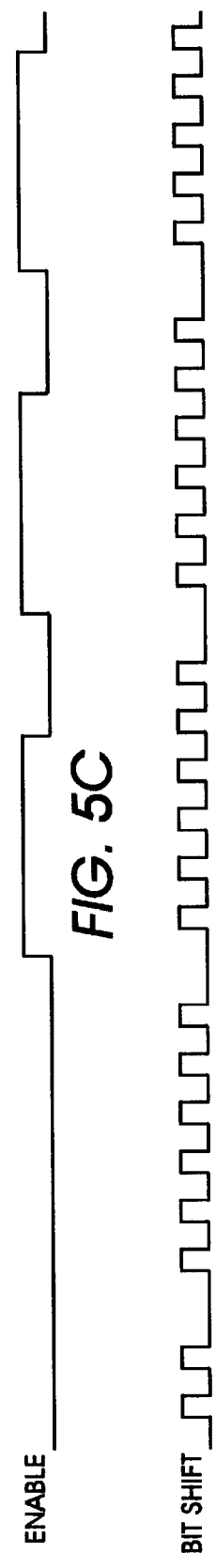

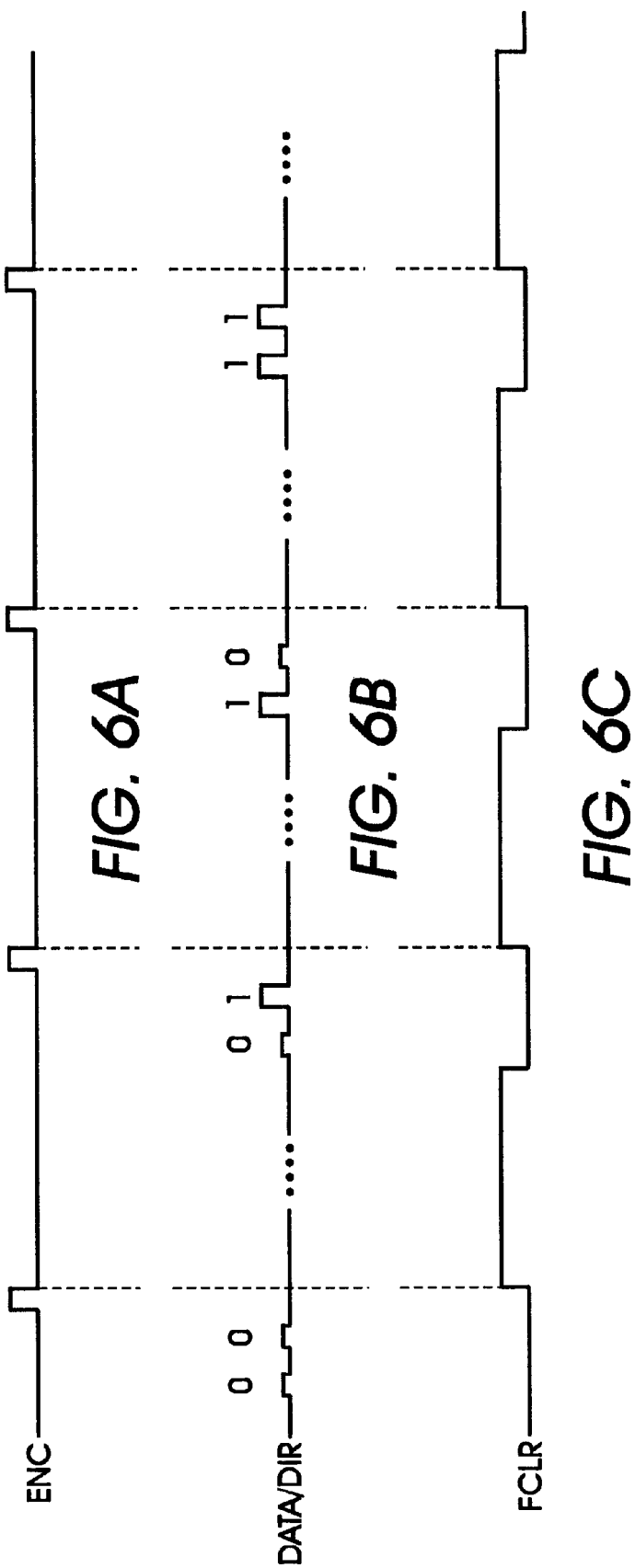

നിക്കു് ...

INK-JET PRINTHEAD WITH ON-CHIP SELECTION OF PRINT MODES

FIELD OF THE INVENTION

The present invention relates to a control system for timing the activation of ejectors in an inkjet printhead.

BACKGROUND OF THE INVENTION

Ink-jet printers, in which an array of small ejectors are operated by digital data in real time to eject droplets of ink onto a sheet to create an image, are well-known. For high-quality ink-jet printing, certain improvements in the ultimate appearance of a print can be made by detailed manipulation of the timing of the activation of individual ejectors. For example, for a printhead having an array of ejectors arranged in an order 1, 2, 3, 4, 5, 6, 7, 8, activating the ejectors in order may result in droplets emitted from neighboring ejectors splashing against each other, thus resulting in undesirable print defects, such as satellite droplets. Within the short time frame in which a set of ejectors accesses a particular small area on a print sheet it may be more desirable to alter the ejection order along the array, such as an order over time of 1, 5, 2, 6, 3, 7, 4, 8: this order will ensure that an ejector to be activated is a number of ejectors away from the previous ejector that was activated, thus avoiding the splashing problem. Alteration of the specific activation order of ejectors in an array, of which the above is only one example, can be used to increase either throughput speed and/or print quality.

Another possible ink-jet printing method is to make available a "draft mode," in which only a subset of ejectors which would ordinarily be activated to print an image are in fact used. While such a draft mode will of course result in lower print quality, it may have the advantage of consuming less ink. One typical draft mode is "checkerboarding" the ink droplets in what is originally intended to be a full-black area. With checkerboarding, with every pass of ejector activations through the linear array, in one pass only even-numbered ejectors are enabled, while in a subsequent pass, only odd-numbered ejectors are enabled. This alternation of odd and even-numbered ejectors as the printhead moves across the sheet creates this checkerboarding effect.

It is a purpose of the present invention to provide an ink-jet printhead having circuitry thereon, which enables the selection of these and other various print modes. According to the present invention, various modes can be selected by sending certain mode signals to the printhead circuitry along with image data signals.

SUMMARY OF THE INVENTION

According to one aspect of the present invention, there is provided a method of operating an ink-jet printhead having a printhead circuitry directly operative of a plurality of ejectors therein. A first mode signal is loaded into the printhead circuitry, the first mode signal commanding the printhead to allow activation of only a first subset of the plurality of ejectors. A set of image signals representative of which of the subset of ejectors are to be activated according to digital image data is loaded into the printhead circuitry.

BRIEF DESCRIPTION OF THE DRAWINGS

In the drawings:

FIG. 1 is a simplified diagram showing the basic elements of a ink-jet printer;

FIGS. 2A–2D are a set of signals illustrating the behaviors of various lines entered into the circuitry shown in FIG. 1;

FIGS. 5A–5D are a set of signals illustrating the operation of the circuits shown in FIGS. 3 and 4; and FIGS. 6A–6C illustrate a set of signals for operating the circuit of FIG. 3 according to an alternate embodiment of the present invention.

DETAILED DESCRIPTION OF THE INVENTION

Figure 3:
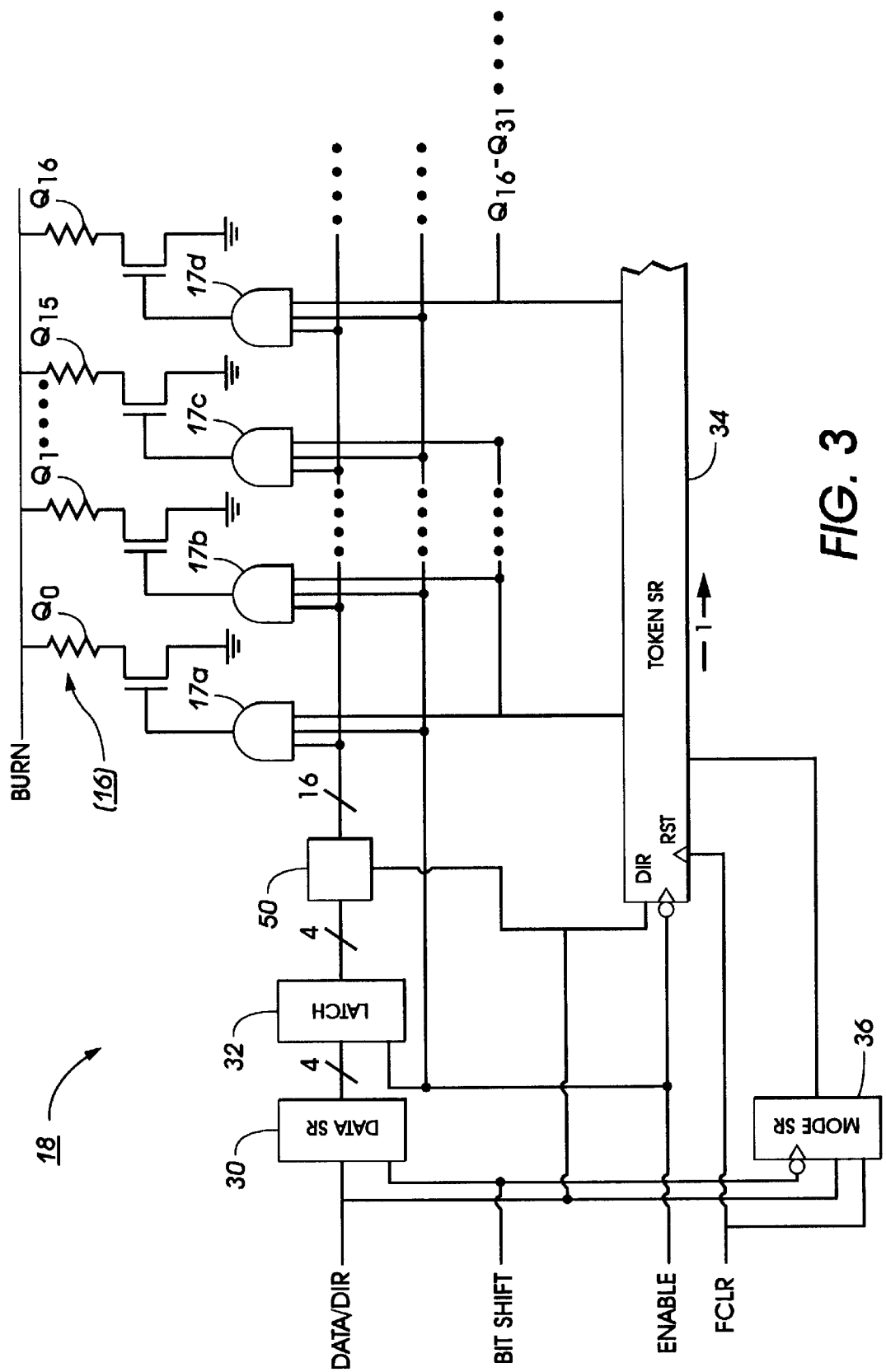
FIGS. 3 is a schematic diagram showing the basic elements of printhead circuitry according to the present invention.

FIG. 1 is a systems diagram showing the basic elements of an ink-jet-based digital printing system, relevant to the present invention. Data representative of an image desired to be printed originates on a host computer generally indicated as 10, which is the familiar personal computer or other device. The host computer 10 sends the image data, typically in a page description language or facsimile format, to a raster image processor, or RIP, 12, which, as is well-known in the art, typically resides within a printing apparatus. The RIP 12 converts the formatted image data from host computer 10 into binary image data which can be directly operative of ejectors in an ink-jet printhead.

As shown in the Figure, the RIP 12 is connected by a plurality of hardware lines to a printhead generally indicated as 14. The printhead 14 includes an array of ink-jet ejectors, indicated as 16, which in turn are directly controlled by on-chip circuitry, indicated as 18. As is known in the art, the ejectors 16 are typically in the form of a linear array, and may be thermal ink jet ejectors, piezoelectric ejectors, or any other type known in the art. The on-chip circuitry 1 8, through a series of hardware lines as shown in the Figure, can directly operate individual ejectors in the array 16 to eject ink onto a print sheet at a particular desired time so that the droplets will be placed on the sheet in accordance with the image desired to be printed.

Further as shown in the Figure, the interconnection between the RIP 12 and the on-chip circuitry 1 8 within printhead 1 4 typically includes at least four lines, although of course other lines may exist as well. Those shown in the Figure are a "function clear" or FCLR line, a data direction or DATA/DIR line, a BIT SHIFT line, and an ENABLE line, the functions of each of which will be described in detail below. Also significant in the Figure is the fact that, within a larger inkjet printing apparatus, the ejectors 16 are intended to move relative to a print sheet, typically on a carriage, in a first carriage direction $C_1$ or a second carriage direction $C_2$.

In a typical design of an ink-jet printhead, as the printhead ejector 16 moves relative to a sheet, the ejectors selected for activation are activated essentially, but not exactly, simultaneously: assuming, in one instance, all of the ejectors in array 16 are intended to be activated according to an image to be printed, the ejector at one end will be activated first, and then the other ejectors will follow in sequence from the end, such as shown by direction $D_1$ in the Figure. Alternately, the ejectors could start ejecting at the other end and move through direction $D_2$. The small time difference as ejections move across a linear array of ejectors 16 will cause an image distortion as the array of ejectors 16 moves through carriage direction $C_1$ or $C_2$ relative to the sheet. In order to compensate for this phenomenon, it is common to tilt the array of ejectors 16, so that it is slightly diagonal relative to the carriage direction $C_1$ or $C_2$. Further as is known in the art, the direction of firing order, either $D_1$ or $D_2$, will depend on the carriage direction, so that straight "vertical" and "horizontal" lines can be created on the print sheet.

Also shown, in simplified form, in the Figure is an "encoder" indicated as 20. As is generally known in carriage-type inkjet printers, the encoder 20 is a device which produces real-time feedback about the velocity and/or position of the printhead relative to the print sheet. Typically, the encoder 20 includes a photosensor fixedly mounted relative to the printhead, which monitors a set of encoder marks on the main body of the printing apparatus. A train of real-time signals is thus generated by the photosensor when the carriage moves relative to the encoder marks, and this train can be applied to the hardware which times the activations of ejectors.

FIGS. 2A–2D are a set of comparative waveforms indicating a typical operation of the four lines shown in FIG. 1 between the RIP 12 and the on-chip circuitry 18. As shown, the Figures illustrate activities on the FCLR, DATA/DIR, BIT SHIFT, and ENABLE lines respectively. With particular reference to FIGS. 2A and 2B, the FCLR line, when high, indicates to the on-chip circuitry 18 that image-related data is being serially loaded into a shift register, for eventual use in activating ejectors in the linear array 16. The DATA/DIR line, shown in FIG. 2B, represents a sequence of digital data levels to be sampled at the falling edge of the BIT SHIFT pulses. Each sampled value corresponds to an individual ejector along the array. As shown in FIG. 2B, all of the data which appear after FCLR goes high indicate that, in this case, the first four ejectors starting from one end of the array will be activated. However, if, for example, the third data sample in the sequence as shown in FIG. 2B were low (i.e., absent), such a signal would indicate that the first, second and fourth, but not the third, ejector would be activated to print a certain desired image.

Also shown in FIG. 2B is a data level indicated as R which, in this example, appears essentially simultaneously with the FCLR function going high. According to one embodiment of the present invention, this value R represents a "directionality" signal indicating to the on-chip circuitry 18 whether the following sequence of serial image data corresponds to activating ejectors in the $D_1$ or $D_2$ direction along the array, as explained above with reference to FIG. 1. For example, if the R level is high in a particular case, this means that the following signals correspond to activating ejectors along the array in direction $D_1$, while if the R signal is low (i.e., absent), this is interpreted by the on-chip circuitry 18 that the following signals correspond to the $D_2$ direction. As mentioned above, whether the $D_1$ or $D_2$ direction of data is chosen will depend on the relative direction of the carriage relative to a print sheet, such as in a bidirectional ink-jet printer.

With references to FIGS. 2C and 2D, the bit shift line in FIG. 2C represents signals applied to a shift register when the shift register in circuitry 18 is accepting the serial digital data on the DATA/DIR line. This external input of bit shifts is useful in a non-self-clocking circuit such as 18, but a self-clocking system according to the present invention is possible as well within the scope of the claims below. The ENABLE signal shown in FIG. 2D represents a line which enables the ejectors in array 16 to be activated by data in the shift register, in a manner which will be described in detail below.

According to the present invention, there are provided on the DATA/DIR line additional signals which appear when the FCLR line is low, that is, when the circuitry 18 is not at the moment accepting image data therein. As a printhead such as 14 moves across a page, with each cycle of the ejectors in array 16 being activated according to image data, there will be an intervening space of "down time" when no image data is being accepted into a shift register controlling the image data going into the array 16. This down time, which is typically from 4% to 20% of the total operational time of printhead 14 moving across a page, can be used for the on-chip circuitry 18 to accept a special "mode signal" which instructs the on-chip circuitry to operate in a particular print mode. In a preferred embodiment, this mode signal can be entered into the on-chip circuitry 18 through the same line as the image data.

As shown in FIG. 2B, mode signals $M_1$ and $M_2$ can be interpreted as a particular mode command within cicuitry 18. As shown in FIG. 2B, both signals $M_1$ and $M_2$ are "high," which creates a binary number of 11, but if one or both of the signals $M_1$ or $M_2$ are low, other binary numbers such as 00, 01, or 10 can be expressed as well, making in this instance four possible mode commands with two serial bits.

FIG. 3 is a schematic diagram showing the essential elements of circuitry 18 as it relates to an array 16 of ejectors (for present purposes, in the form of resistors). In the Figure, resistors corresponding to individual ejectors in array 16 are individually numbered from $Q_0$, $Q_1$, up to as many individual ejectors which are desired to be in the array. In typical commercially-useful printheads, the number of ejectors often exceeds one hundred. For purposes of describing the present embodiment of the invention, it is significant that the ejectors are organized in distinct "blocks," each block of ejectors having a fixed number of ejectors therein. For reasons which will be explained in detail below, the first sixteen ejectors in the array, here summarized as $Q_0 \ldots Q_{15}$, are considered one single block of ejectors, while the next contiguous set of ejectors, $Q_{16} \ldots Q_{31}$, form a second block of ejectors, and so forth up to as many blocks of ejectors are desired in the printhead.

As shown in the Figure, each resistor $Q_0$, $Q_1$, etc., is in the form of a resistor which, as is known in thermal ink-jet printheads, ultimately acts to nucleate a vapor bubble of ink in a channel adjacent the resistor. (It will be apparent that an equivalent structure to a resistor, such as a piezoelectric structure, could serve in a different type of printhead.) Each resistor is accessed to a source of "burn voltage" which is the source of energy to cause the nucleation. Each resistor is ultimately activated by a transistor associated therewith, which in turn is ultimately controlled by the output of an associated AND gate, each of which is here indicated as 17a, 17b, etc. Only when all of the inputs to a particular AND gate are high will the output of the AND gate cause the burn voltage to pass through the associated resistor.

The basic control lines shown in FIG. 1 are also shown in FIG. 3. The DATA/DIR line is associated with a data shift register 30, where the serial input of image data is loaded prior to its use in activating a certain subset of ejectors 16. The data shift register 30 is associated with a latch 32. When the time in a cycle comes to begin activating the ejector 16, the signal on the enable line activates latch 32, and the loaded digital signals in latch 32 are then applied, as shown, in sequence to the AND gate 17.

Also shown in the Figure is a token shift register, indicated as 34. As is known in ink-jet printheads, the function of the token shift register is to enable the orderly activation of a series of ejectors connected in parallel therewith, as shown. The token shift register 34 is loaded with a set of 0's, with a single digital 1 being caused to move across the parallel outputs of shift register, thus activating one output line at a time in sequence. As shown in the Figure, the token shift register 34 is reset by the function clear FCLR line going high and also the ENABLE line going low.

As mentioned above, the various ejectors $Q_0$, $Q_1$ . . . forming array 16 are arranged in distinct blocks. Looking at token shift register 34, the serial outputs thereof are each connected to a plurality of AND gates 17. In this sense, a block of ejectors can be defined as a set of ejectors all of which are connected to the same output of token shift register 34. As shown in the Figure, the first block of ejectors $Q_0$–$Q_{15}$ are ultimately connected to the same output of the shift register 34, while a second set of ejectors $Q_{16}$–$Q_{31}$ are connected to a second serial output, and there will be as many serial outputs of token shift register 34 as there are blocks of ejectors in the printhead. Thus, whenever the token "1" is associated with a particular parallel output of token shift register 34, the output from token shift register 34 will be high for all of the AND gates connected to that particular parallel output. This function will enable ejectors to be activated at various times across all blocks in a printhead, as will be described below.

Further as can be seen in the Figure, there is provided a "mode shift register" indicated as 36. The mode shift register 36 accesses the DATA/DIR line, the bit shift line (which also controls the data shift register 30), and thus accepts the pulses therein which appear on the DATA/DIR line when FCLR is low. Thus, the mode signals such as $M_1$ or $M_2$ are converted to a 2-bit parallel output by the mode shift register 36.

Also shown, between latch 32 and the set of AND gates 17 which activate ejectors in the array 16, what shall here be called a "distributor" 50. The function of distributor 50 is to take the output from mode shift register 36 (which ultimately is effected by the status of mode signals $M_1$, $M_2$ as shown in FIG. 2) to activate the subset of AND gates according to the instructions in the mode signals. In other words, distributor 50 is a set of logical devices which respond to instructions in the form of the mode signal to enable a particular subset of ejectors in array 16.

Figure 4:
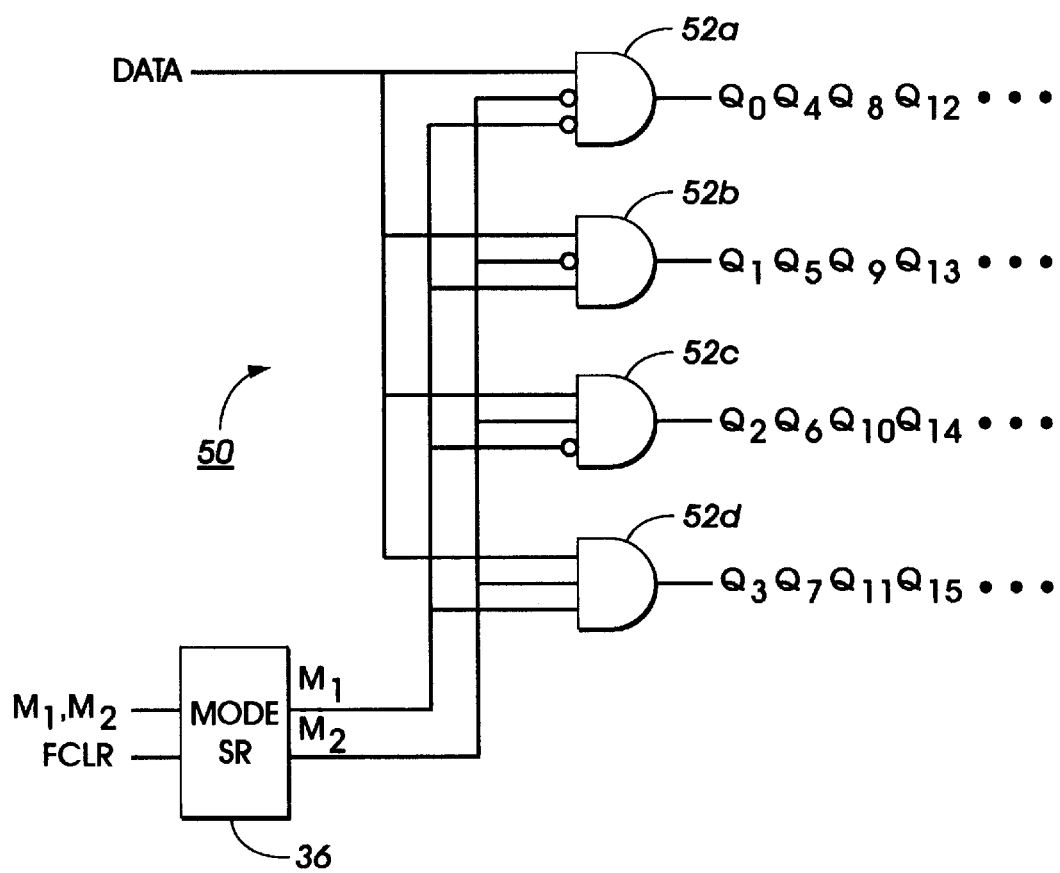
FIG. 4 is a schematic diagram showing a detail of the circuit shown in FIG. 3.

FIG. 5 is a schematic view of a portion of distributor 50, according to a possible embodiment of the invention. It will be seen in FIG. 5 that the portion shown in the Figure relates to one data line of the multiple data lines which enter the entire distributor 50, as shown in FIG. 4. Also operatively associated with the distributor 50 is the output of mode shift register 36, which in this case are simply the parallel values of mode signals $M_1$ and $M_2$ as shown in FIG. 2. It will be apparent, of course that the total values of $M_1$, $M_2$ in this embodiment will be 00, 01, 10, or 11 at any particular time.

Each of the parallel data lines entering a distributor 50 is connected to a plurality of AND gates, indicated as 52a–d. Also associated with each AND gate 52a–d are the two outputs associated with mode signals $M_1$ and $M_2$ from mode shift register 36. It will be noted from the Figure that each individual AND gate 52a–d has a unique relationship of NOT inputs relative to the other AND gates 52; thus only one individual AND gate 52a–d will be enabled depending on the value 00, 01, 10, 11 from the mode shift register 36. The configuration of the various NOT inputs to the AND gates thus manifests a translation of the mode signals $M_1$, $M_2$ to a particular subset of AND gates 17 corresponding to the ejectors in the array 16.

Further shown in FIG. 5 is a set of indicators corresponding to outputs $Q_0$ $Q_1$, $Q_2$, . . . $Q_{15}$; these represent outputs to a set of AND gates which activate individual ejectors along array 16 in a single block of ejectors. As shown in FIG. 5, each column of outputs, such as outputs $Q_0$–$Q_3$, represent one adjacent set of AND gates 17, but could also represent, according to a particular design, an evenly-spaced subset of AND gates 17 along the array 16. The various AND gates 52a–d can activate all of the outputs shown in FIG. 5, but only those AND gates 17 which are also simultaneously enabled by the token shift register 34 at a given time will in fact be available for activating a particular ejector.

In a practical implementation of the distributor 50, the circuits shown in FIG. 5 are in fact replicated four times, and there are four data lines from latch 32 entering distributor 50, as shown in FIG. 3. There will be thus an output of sixteen lines, each of the sixteen lines going to one of sixteen AND gates 17, and of course sixteen ejectors. Thus, each AND gate 52a–d shown in FIG. 5 is directed to one AND gate 17 per block of ejectors. For a typical commercial printhead having in excess of one hundred ejectors arranged in blocks of sixteen ejectors each, an activation of a particular block is, as mentioned above, ultimately enabled by the behavior of the token digit through token shift register 34.

The following table illustrates how control over these inputs on the same hardware can control the specific behavior of the ejection process, in a printhead having N blocks of M ejectors each. The block order in the table is manifested as whether the direction signal R in FIG. 2 above is high or low. Given the wiring of a printhead circuitry 18 as shown in FIG. 3, M will also equal the number of ejectors activated as a result of the token being at a particular location within token shift register 34 at any given time. Multiple passes of the token digit through the token shift register 34 may be required to activate all possible ejectors. It will be apparent, however, that these various "print modes" below can all be achieved on the same hardware, by manipulating the signals on the four main lines into the printhead circuitry 18.

| Print mode | Block Order | # of ejectors activated per block | # of passes of token through token SR |
|---|---|---|---|
| All ejectors addressed, up | 1 to N | M/4 | 4 |
| All ejectors addressed, down | N to 1 | M/4 | 4 |
| Half of ejectors addressed (e.g. for checkerboarding) | 1 to N | M/4 | 2 |
| ¼ of ejectors addressed | 1 to N | M/4 | 1 |

FIGS. 5A–5D is a sample set of inputs for the basic hardware shown in FIGS. 3 and 4, illustrating the operation of the present invention. A series of data and other signals are entered in the DATA/DIR line (FIG. 5B) in synchronization with the FCLR line (FIG. 5A) and the external bit shift line (FIG. 5D). When the FCLR level is high, as mentioned above, the signals on DATA/DIR are accepted as image data and not mode signals. As shown in FIG. 5B, when FCLR is in a high cycle there is entered on line DATA/DIR a train of pulses which are to be directed as image data to a certain subset of ejectors which have been selected by the preceding mode signals, the subset being enabled by the mode signals applied to distributor 50, as shown in FIG. 4. Although only four data pulses are shown for each subset in FIG. 5B, the train of data pulses in each group can be as long as necessary to supply image data to a subset of ejectors across an entire printhead array 16, i.e., which may have over one hundred ejectors.

Following the entry of a certain number of data pulses (a number sufficent to provide image data to every ejector in a subset), the mode signals are iterated, or altered, so that the mode signals $M_1$, $M_2$ are successively 00, 01, 10, 11. This iterating can be performed by mode shift register 36, in response to detecting a certain number of FCLR level changes over time. If the $M_1$, $M_2$ signals are applied, for example, through mode shift register 36 and then to the various AND gates of the distributor shown in FIG. 4, it is clear that by the selection of signals $M_1$, $M_2$ the immediately-following data pulses will be directed as desired to a selected subset of ejectors.

Also shown in FIG. 5C is the behavior of the enable line, which causes the ejectors to be activated and release ink onto a sheet; in this particular design, the enable pulses lag the data pulses for a particular subset of ejectors, because a cycle is required between the loading of data into the printhead circuitry and the activation of the selected ejectors as a result of the image data being loaded.

According to an alternate embodiment of the present invention, the function FCLR line, which controls the behavior of the circuitry 18 in response to pulses on the DATA/DIR line, can be directly associated with real-time encoder pulses caused by the motion of a printhead relative to a sheet, such as described above with reference to FIG. 1. FIGS. 6A–6C are a set of comparative signals showing how the FCLR pulses, in FIG. 6C, can be tied to a series of encoder pulses which occur in real time and are fed into on-chip circuitry 18 from an encoder 20. Of importance in this instance is the fact that, in a fixed time relationship to each encoder pulse as in FIG. 6A, the mode signals on the DATA/DIR (FIG. 6B) line are iterated, so that a new subset of ejectors are activated with each encoder pulse. Alternately, a system could be provided in which an encoder pulse always resets the mode signals, such as to 00, and the iteration through other modes is performed automatically by mode shift register 36. Such a system will require that the encoder pulses occur at a sufficiently high frequency to keep a spatial lag between the spots created by different subsets of ejectors from being noticeable. If the encoder pulses are of sufficiently high frequency, the overall effect can be indistinguishable from multiple subsets of ejectors being effectively caused to be ejected at the same time.

With the basic capabilities described in the circuitry herein, various print modes can be carried out merely by manipulating the signals on the four basic lines in to circuitry 18. For example, by controlling the values of $M_1$ and $M_2$ into mode shift register 36 at various times, one could, for example, enable only the activation of the even- or odd-numbered ejectors across a large array 16, and even alternate whether even or odd ejectors are enabled with each pass, thus facilitating the "checkerboard" draft mode. Further, by controlling the sequence of iterations of the mode signals $M_1$, $M_2$, one can control a specific order of activation of ejectors along the array 16. A key feature of the present invention is that this selection of a print mode is carried out in real time by instructions to circuitry directly on the printhead. Indeed, according to the above-described embodiment of the present invention, the mode signals $M_1$, $M_2$ which determine which subset of ejectors are activated at a given time, are placed directly on the data line through which the image data passes.

While the invention has been described with reference to the structure disclosed, it is not confined to the details set forth, but is intended to cover such modifications or changes as may come within the scope of the following claims.

I claim:

1. A method of operating an ink-jet printhead having printhead circuitry directly operative of a plurality of ejectors, comprising the steps of:

loading into the printhead circuitry a first mode signal distinct from the image signals, the first mode signal commanding the printhead to allow activation of only a first subset of the plurality of ejectors; and loading into the printhead circuitry a set of image signals representative of which of the first subset of ejectors are to be activated according to digital image data, whereby the allowed activation of only the first subset of the plurality of ejectors commanded by the mode signal supersedes the image signals.

2. The method of claim 1, further comprising the steps of loading into the printhead a second mode signal, the second mode signal commanding the printhead circuitry to allow activation of only a second subset of the plurality of ejectors; and loading into the printhead circuitry a set of image signals representative of which of the second subset of ejectors are to be activated according to digital image data.

3. The method of claim 1, further comprising the steps of in response to a predetermined amount of image data being loaded into the printhead circuitry, altering the first mode signal to be a second mode signal, the second mode signal commanding the printhead circuitry to allow activation of only a second subset of the set of ejectors; and loading into the printhead circuitry a set of image signals representative of which of the second subset of ejectors are to be activated according to digital image data.

4. The method of claim 1, wherein the image signals and the mode signals are loaded into the printhead on a single line.

5. The method of claim 1, further comprising the steps of monitoring motion of the printhead relative to a print sheet;

deriving a train of encoder signals from said relative motion of the printhead; and loading the first mode signal into the printhead in response to an encoder signal.

\* \* \* \* \*